United States Patent [19]

Shibata et al.

[11] 4,095,166

[45] June 13, 1978

[54] DC VARIABLE VOLTAGE DEVICE

[75] Inventors: Nobuho Shibata, Katano; Tutomu Seri, Kyoto; Norio Umezawa, Hirakata; Takeshi Morofuji, Kadoma, all of Japan

[73] Assignee: Matsushita Electric Industrial Co., Ltd., Osaka, Japan

[21] Appl. No.: 750,975

[22] Filed: Dec. 15, 1976

[30] Foreign Application Priority Data

| Feb. 19, 1976 | Japan | 51-17630 |
| Mar. 3, 1976 | Japan | 51-23571 |
| Mar. 5, 1976 | Japan | 51-24455 |
| Mar. 25, 1976 | Japan | 51-33365 |

[51] Int. Cl.² ............................................. G05F 1/58
[52] U.S. Cl. ............................ 323/17; 323/DIG. 1; 363/124; 363/131; 363/135
[58] Field of Search ................... 323/17, DIG. 1; 363/110, 124, 131, 135; 307/240, 252 J, 252 M, 246; 318/230, 345

[56] References Cited

U.S. PATENT DOCUMENTS

| 3,093,790 | 6/1963 | Ehret | 323/DIG. 1 |
| 3,487,234 | 12/1969 | Morgan | 363/131 |
| 3,628,047 | 12/1971 | Cronin et al. | 323/DIG. 1 |
| 4,034,281 | 7/1977 | Morita et al. | 363/124 |

*Primary Examiner*—Gerald Goldberg
*Attorney, Agent, or Firm*—Burgess, Ryan and Wayne

[57] ABSTRACT

Disclosed is a variable DC voltage device wherein one terminal of a DC power supply, a switch, a first coil of a transformer, a second coil mounted on a core of the transformer with the same polarities with those of the first coil, a diode for preventing a shortcircuiting of the DC power supply when the switch is closed and the other terminal of the DC power supply are connected in series in the order named; a load is interconnected between the junction between the first and second coils and the other terminal of the power supply; and a compensation circuit is provided for restoring to an initial state the flux variation caused when the switch is closed, whereby the load is controlled by the alternate opening and closing of the switch.

18 Claims, 29 Drawing Figures

DC VARIABLE VOLTAGE DEVICE

BACKGROUND OF THE INVENTION

The present invention relates to generally an improvement of choppers or vibrators and more particularly a chopper wherein when an output voltage is low, a maximum allowable output current may be increased by the transformer action and a pulsation factor may be considerably decreased as compared with prior art choppers.

In FIGS. 1 and 2 there are shown two examples of the prior art choppers. Reference numeral 1 denotes a DC power supply; 2, a switch; 3, a load; 4, a circulation diode and 5, a smoothing reactor. As is well known in the art, the switch 2 is alternately opened and closed by various methods and a maximum current flowing through the load is restricted by a maximum allowable output current of the switch 2 independently of an output voltage. Therefore when the load 3 is a DC drive motor of a rolling stock or the like, a greater current is required when accelerated; that is, at a low voltage as compared when driven at high speeds; that is, at high voltages. In order to provide a maximum current at acceleration, a current capacity of switching elements must be increased.

SUMMARY OF THE INVENTION

One of the objects of the present invention is therefore to provide a DC variable voltage device wherein a maximum allowable output current may be increased by the transformer action at a low output voltage and a pulsation factor may be considerably reduced as compared with the prior art choppers.

Another object of the present invention is to increase a range through which magnetic flux which may be utilized may be varied by flowing maximum exciting current so as to bring the core into saturation in the reverse direction, whereby a DC variable voltage device with a small size core may be provided.

A further object of the present invention is to provide a variable DC voltage device wherein rapid transfers of power may be effected between a power supply and a load such as a DC motor when the latter is accelerated or decelerated so that control with a fast response of the DC motor may be possible.

BRIEF DESCRIPTION OF THE DRAWINGS

Same reference numerals are used to designate similar parts throughout the figures.

DESCRIPTION OF THE PREFERRED EMBODIMENTS

Figure 1:
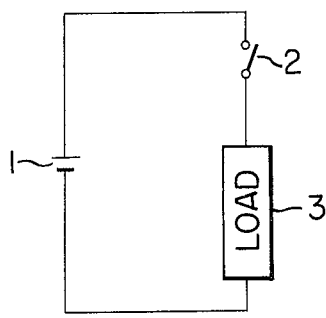
FIGS. 1 and 2 show two examples, respectively, of the prior art choppers.
Figure 2:
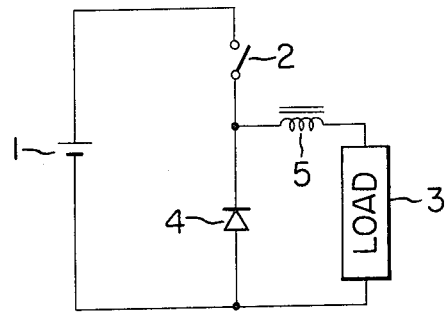
Figure 3:
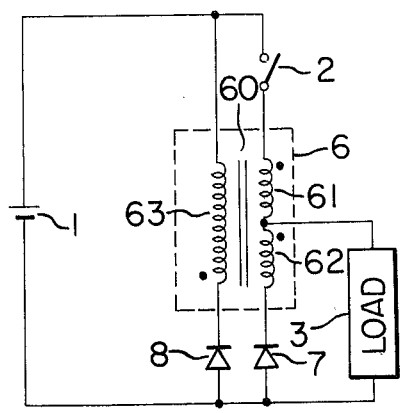
FIGS. 3 and 4 are circuit diagrams of improvements, respectively, in accordance with the present invention over the circuits shown in FIGS. 1 and 2.
Figure 4:
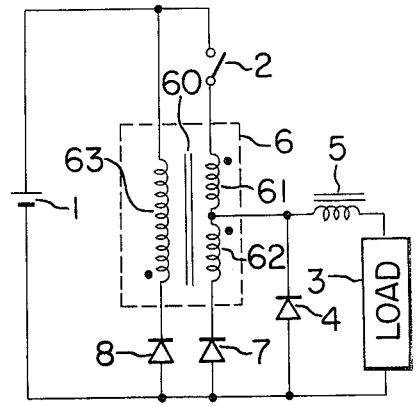

In FIGS. 3 and 4 there are shown a first and a second embodiments, respectively, of the present invention which are improvements of the devices shown in FIGS. 1 and 2, respectively. A transformer 6 consists of a core 60 and first, second and third windings or coils 61, 62 and 63 having number of turns $W_{61}$, $W_{62}$ and $W_{63}$, respectively, and being wound in the directions indicated by the dots. The third coils 63 functions as a circuit for compensating the change in magnetic flux in the transformer core 60 or bringing the magnetic flux to an initial state. Diodes 7 and 8 are connected in series to the second and third coils 62 and 63, respectively.

The mode of operation of the first embodiment shown in FIG. 3 is substantially similar to that of the second embodiment shown in FIG. 4 so that only the former will be described. When the switch 2 is closed, a voltage is impressed across the series-connected first and second coils 61 and 62 so that current flows through the first coil 61 into the load 3. Under these conditions, exciting current tends to flow in the reverse direction of the diode 7 and a part of the load current tends to flow in the forward direction of the diode 7 by the transformer action. The exciting current is small as compared with the load current so that the diode 7 is enabled to conduct and consequently the first and second coils 61 and 62 function as an autotransformer. As a consequence, an output voltage decreases to $W_{62}/(W_{61}+W_{62})$ as compared with an input voltage while an output current increases to $(W_{61}+W_{62})/W_{62}$. Let Vs denote a power source voltage; T, a switching period of the switch 2; $T_{ON}$, a time interval when the switch 2 is closed; and a, and "ON-time ratio" as defined by $a = T_{ON}/T$, and assume that magnetic flux is increased in the core 60 during the closed time interval of the switch 2 and that no saturation of the core occurs. Then, the magnetic flux increase $\Delta\phi_t$ is given by $$\Delta\phi_t = \frac{V_s \cdot a \cdot T}{W_{61} + W_{62}} \quad (1)$$

When the switch 2 is opened, magnetic flux in the core 60 is reduced because of a closed circuit consisting of a diode 8, the coil 63 and a DC power supply 1. If all magnetic fluxes would disappear when the switch 2 is opened, then a possible decrease of flux $\Delta\phi-$ would be $$\Delta\phi- = \frac{-V_s}{W_{63}}(1-a)T \quad (2)$$

In the steady state, the increase in magnetic flux is equal to the decrease in flux. With a small "ON-time ratio", an increase in magnetic flux is completely decreased when the switch 2 is opened, but when an "ON-time ratio" is higher than such a ratio at which the increase in magnetic flux expressed by Eq. (1) is equal to the possible decrease in magnetic flux expressed by Eq. (2), the increase in magnetic flux is greater than the decrease in magnetic flux so that the magnetic flux in the core keeps increasing and consequently the core is saturated at a time when the switch 2 is closed. The stable state is arrived at when the increase and decrease in magnetic flux are equal. Let $a_s$ denote an "ON-time ratio" at which the increase expressed by Eq. (1) is equal to the decrease expressed in Eq. (2). Then, $a_s$ is mathematically expressed as follows:

$$a_s = \frac{W_{61} + W_{62}}{W_{61} + W_{62} + W_{63}} \quad (3)$$

Therefore, when $a < a_s$, the transformer action takes place, but with $a > a_s$, the transformer action occurs during an initial time of the ON period of the switch 2. However when the increase in magnetic flux becomes equal to a decrease in flux during an OFF period of the switch the core is saturated and the device functions in a manner substantially similar to that of the conventional choppers or vibrators. The higher $a$ than $a_s$, the longer a period when the core is saturated becomes, and when $a = 1$, the core is saturated for a full cycle.

Figure 5:
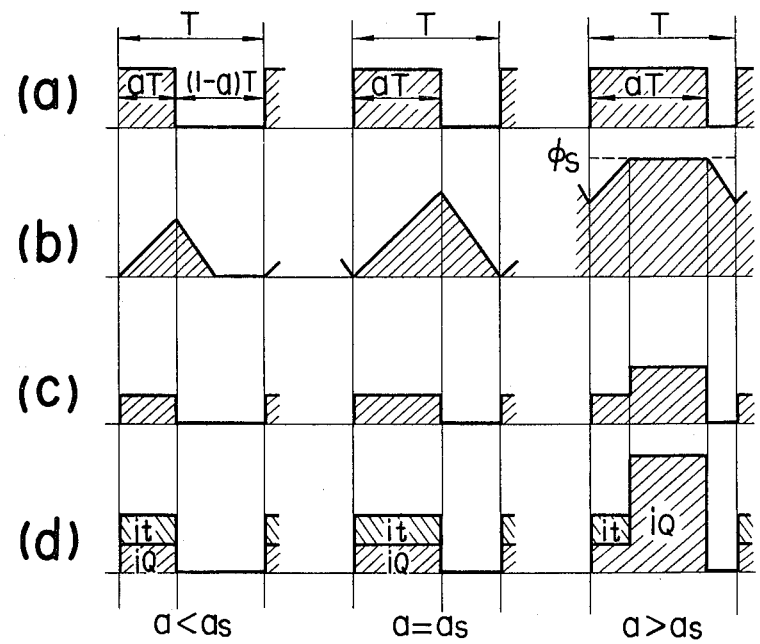
FIG. 5 is a diagram used for the explanation of the mode of operation of the circuit shown in FIG. 3.
Figure 6:
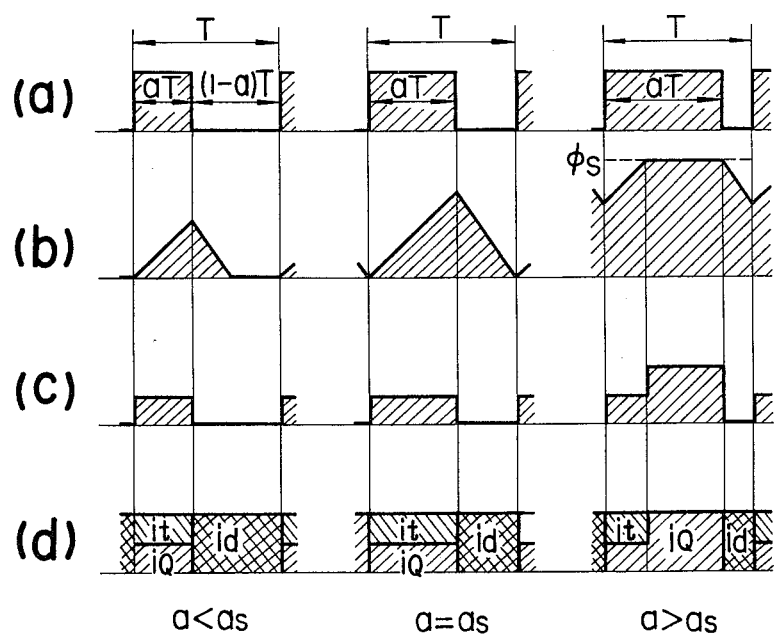
FIG. 6 is a diagram used for the explanation of the mode of operation of the circuit shown in FIG. 4.
Figure 7:
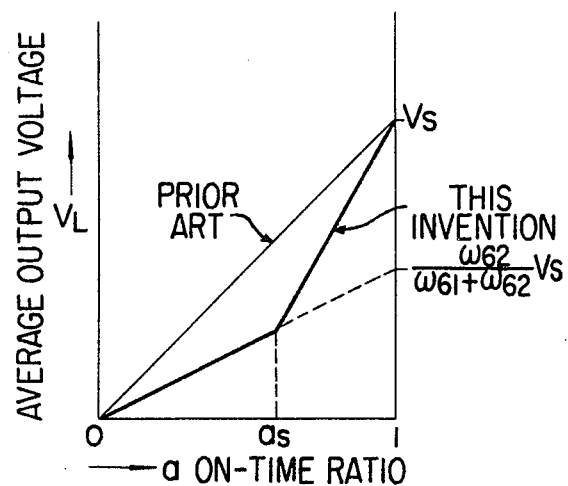
FIG. 7 shows an output voltage characteristic curve of the circuits shown in FIGS. 3 and 4.

The modes of operation of the first and second embodiment are graphically shown in FIGS. 5 and 6, respectively. FIGS. 5(a) and 6(a) show the switching cycles of the switch 2. FIGS. 5(b) and 6(b) show the increase and decrease in magnetic flux in the core 60. FIGS. 5(c) and 6(c) shows output voltages. FIGS. 5(d) and 6(d) show output currents with $i_Q$ = current flowing through the switch 2, $i_t$ = current flowing through the coil 62 by the transformer action and $i_d$ = current flowing through the diode 4. FIG. 7 shows the relationship between a and average output voltages $V_L$.

As is clear from the above explanation, according to the present invention, current flowing through the switch may be made smaller as compared with the conventional choppers or vibrators for obtaining comparable output current. As a result, the output current may be advantageously increased without the increase of a maximum allowable current of the switch. Furthermore, as is clear from the characteristic curve shown in FIG. 7, the "ON-time ratio" is increased as compared with the conventional choppers for obtaining the same output voltage so that the form factor may be considerably improved.

The term "form factor" as herein employed is defined as the ratio of the effective or r.m.s. voltage to the average voltage. The closer the form factor is to unity, the lower is the voltage and current ripple.

In the first and second embodiments shown in FIGS. 3 and 4, the circuit for restoring the magnetic flux in the core to the initial state has been described and shown as consisting of the coil 63 and the diode 8, but many variations and modifications may be considered as will be described below.

Figure 8:
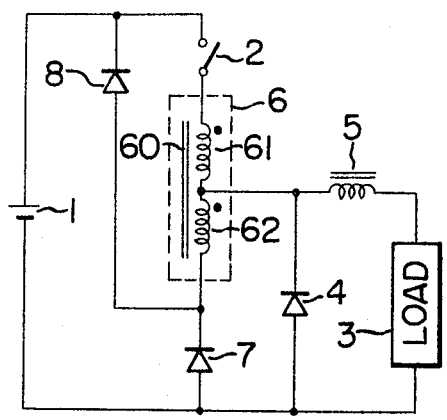
FIGS. 8, 9 and 10 show modifications, respectively, of the circuit shown in FIG. 4.
Figure 9:
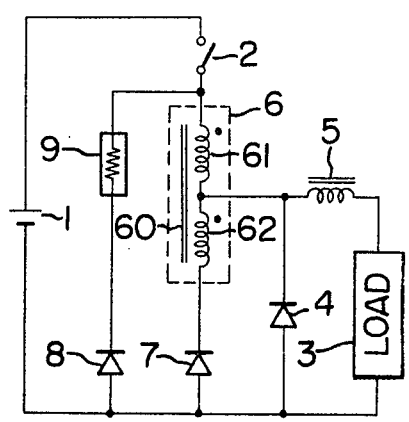
Figure 10:
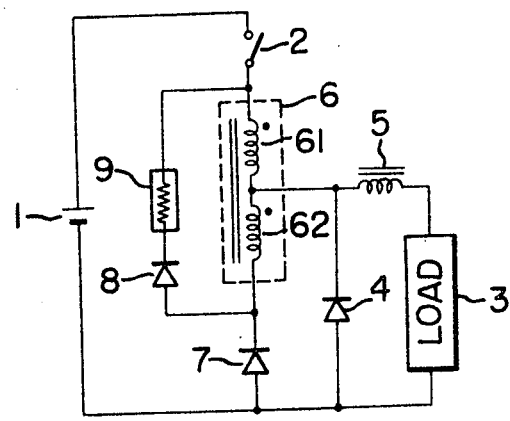

In FIGS. 8, 9 and 10 there are shown three modifications, respectively of the second embodiment shown in FIG. 4. In FIG. 8, the third coil 63 is replaced by the second coil 62. Current is made to flow in the reverse direction of the DC power supply 1 through a circuit consisting of the diode 4, the second coil 62 and the diode 8, whereby magnetic flux may be restored to an initial state. This modification has an advantage in that the third coil 63 may be eliminated, but there arises a problem that degrees of freedom are restricted in design.

In the modifications shown in FIG. 9, the first coil 61 is used to restore the magnetic flux in the core to an initial state. When the switch 2 is opened, circulation current flows so that the diode 4 is enabled to conduct. As a result, current flows through a circuit consisting of the first coil 61, the diode 4, and diode 8 and a resistor 9 so that the magnetic flux is decreased.

More specifically, when the switch 2 is opened, the load current flowing through the inductor 5 and the load 3 circulates through the diode 4. This circulating load current changes slowly and is much larger than the exciting current which acts to decrease the magnetic flux in the inductor 61. Therefore, rather than flowing through the inductor 5 and load 3, the exciting current of the inductor 61 flows through the diode 4 in the reverse direction against the circulating load current flowing through the diode 4, the inductor 5 and the load 3. The circulating load current maintains the diode 4 forward biased under these conditions.

In the modification shown in FIG. 10, current flows through a circuit consisting of the first and second coils 61 and 62, the diode 8 and the resistor 9, whereby the magnetic flux is stored to an initial state.

Figure 11:
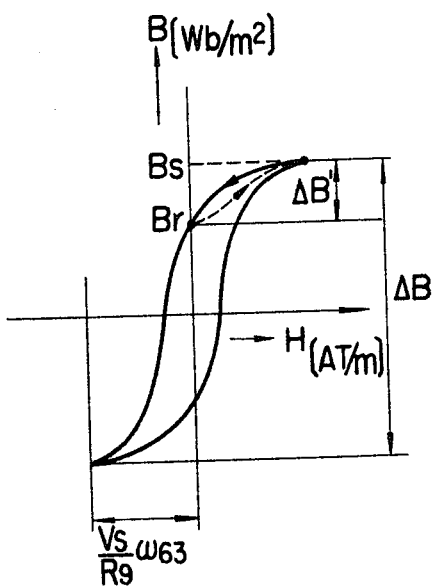
FIG. 11 shows a B-H curve of a transformer core used for the explanation of flux variation therein.

When the first and second embodiments and their modifications are reviewed from a standpoint of utilization of a transformer core, it is seen that the core is operated between a residual flux density Br and a saturation flux density Bs on the B–H curve shown in FIG. 11 so that the most effective use of the core has not been made. As a consequence, a core large in size must be employed in order to attain a comparable flux variation. To overcome these problems, the present invention further provides a modification shown in FIG. 12.

Figure 12:
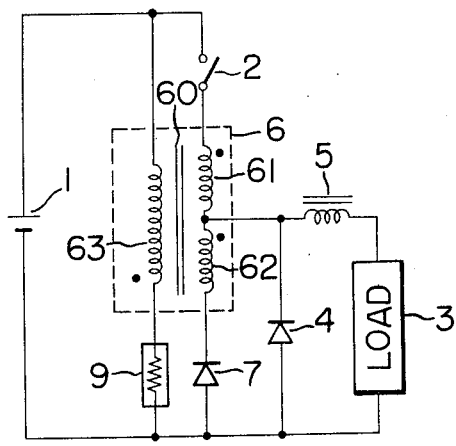
FIGS. 12, 13, 14 and 15 are circuit diagrams of modifications, respectively, of the circuit shown in FIG. 4.

The modification shown in FIG. 12 is an improvement of the second embodiment shown in FIG. 4, and instead of the diode 8 a resistor 9 with a value $R_9$ is used. When the switch 2 is closed, a voltage induced across the third coil 63 is $$\frac{W_{63} \cdot V_s}{W_{61} + W_{62}}$$

and a voltage $$\frac{W_{61} + W_{62} + W_{63}}{W_{61} + W_{62}} Vs$$

is impressed across the resistor 9 with a resultant loss. When the core is saturated, no transformer action occurs and consequently the voltage Vs of the power supply is impressed across the resistor 9. When the switch 2 is opened, the exciting current which has been flowing through the transformer when the switch 2 is closed tends to flow through the third coil 63. A voltage $$Vs + R_9 I_f$$

where $I_f$ = exciting current, is induced across the third coil 63 so that the exciting current is decreased and so is the flux. At $I_f = 0$, the core retains the residual flux density. In the first and second embodiments shown in FIGS. 3 and 4, the magnetic flux density would not drop below the residual magnetic flux density, but in the improvement shown in FIG. 12 it is possible to further excit in the reverse direction to $Vs/R_9W_{63}$ amper-turn. Therefore when the value of the resistor 9 is so selected that a maximum reverse exciting current may saturate the core in the reverse direction, a variation in flux density which may be utilized becomes almost twice as much as the saturation flux density so that a core small in size may be used.

Figure 13:
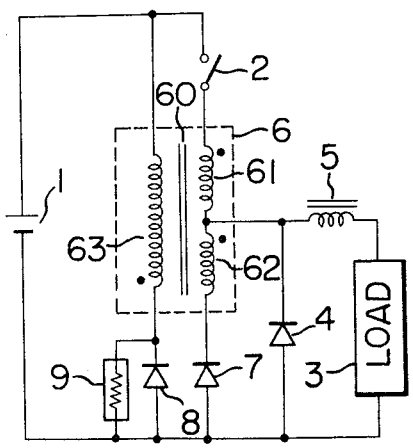

In FIG. 13 there is shown an improvement of the circuit shown in FIG. 12. The resistor 9 is connected in parallel with the diode 8. In the modification shown in FIG. 12, when the switch 2 is opened, a voltage (Vs + $R_9I_f$) is induced across the third coil 63 so that a voltage $$[(Vs + R_9 I_f) \frac{W_{61}}{W_{63}}]$$

is induced across the first coil 61. Therefore with increase in the exciting current $I_f$, the voltage induced across the first coil 61 increases so that the voltage rating of the switch 2 must be increased. However, in the current shown in FIG. 13, the diode 8 has a function of clamping the voltage across the third coil 63 to the power supply voltage Vs so that the switch 2 may have a relatively small voltage rating.

Figure 14:
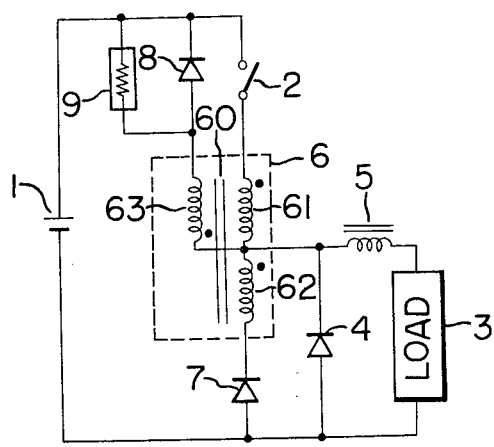

FIG. 14 shows a modification of the circuit shown in FIG. 13. In order to minimize a loss caused by the resistor 9, one end of the third coil 63 is connected to the junction between the first and second coils 61 and 62. As a result, when the switch 2 is closed, the voltage impressed across the resistor 9 may be reduced by an amount equal to the voltage induced across the third coil 63 and consequently the power loss through the resistor 9 may be reduced.

Figure 15:
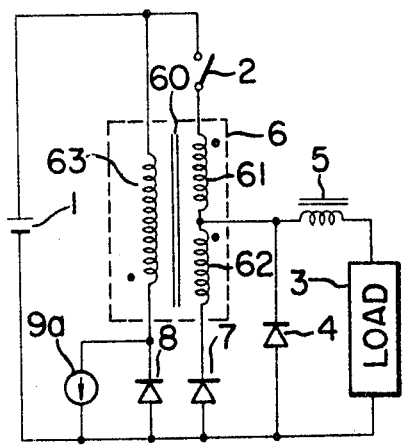
Figure 16:
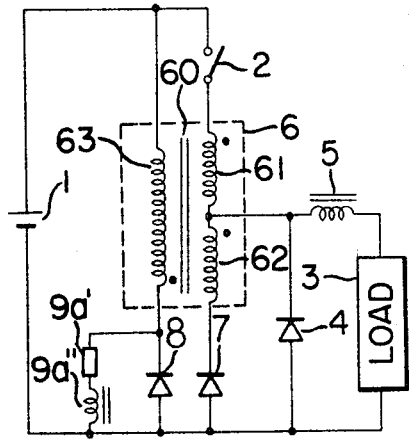
FIG. 16 is a practical circuit diagram of the circuit shown in FIG. 15.

In FIG. 15 there is shown a further improvement of the second embodiment shown in FIG. 4. A constant current source 9a is connected in parallel with the diode 8. A practical circuit of the improvement shown in FIG. 15 is shown in FIG. 16, where a series-connected circuit of a resistor 9a' and a reactor 9a" is connected in parallel with the diode 8 as a constant current source. The magnitude of current supplied from the constant current source may be so suitably selected that the core may be magnetized in the reverse direction for more effective use thereof.

Figure 17:
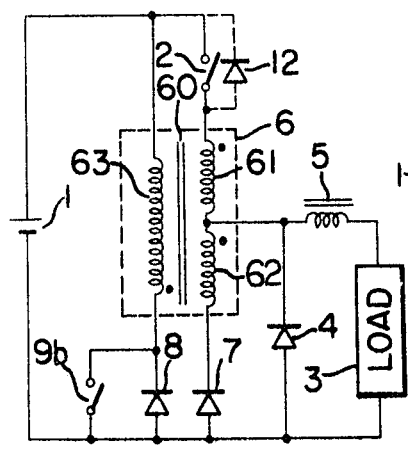
FIG. 17 shows a further modification of the circuit shown in FIG. 4.

A still further improvement of the second embodiment is shown in FIG. 17, wherein in order to magnetize in the reverse direction without the introduction of a loss due to the resistor, a second switch 9b is connected in parallel with the diode 8 and is so controlled that it may be closed only when the flux increase rate of the transformer is negative. When the first switch 2 is closed, the flux increase rate is positive so that the second switch 9b is opened. When the first switch 2 is opened, the flux is decreased and the second switch 9b is closed. The power supply voltage is impressed across the third coil 63 so that the core is magnetized in the reverse direction and is finally saturated. As a consequence the flux increase rate becomes zero and then the second switch 9b is opened. When the diode 4 is conducting circulation current, a voltage which would be induced across the second coil 62 is clamped by the diodes 4 and 7 so that the core is gradually restored to an initial state from the reverse saturated state. When the diode 4 is not flowing current, voltage would be induced across each of the first and second coils 61 and 62. Therefore it is desired to insert a diode 12 as indicated by broken lines so that the voltage induced across the first and second coils 61 and 62 may be clamped to the power supply voltage Vs.

Figure 18:
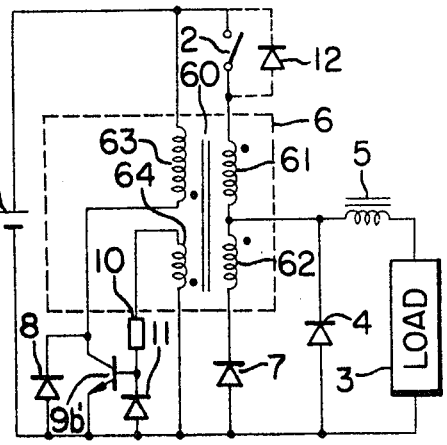
FIG. 18 is a practical circuit diagram of the circuit shown in FIG. 17.

A practical circuit of the improvement shown in FIG. 17 is shown in FIG. 18, wherein instead of the second switch 9b, a transistor 9b' is used and a fourth coil 64 with polarities shown is mounted on the core 60. A voltage induced across the fourth coil 64 is applied through a resistor 10 to the base of the transistor 9b' so that the latter is enabled to conduct only when the flux increase rate is negative. A diode 11 is inserted in order to prevent a reverse voltage from being applied between the base and emitter of the transistor 9b'.

So far the third coil 63 has been used in a circuit for restoring the flux in the core to an initial state. However, it will be noted that other circuit designs may be utilized as far as they may impress a reverse voltage across the first and second coils 61 and 62. Alternatively, the core may be combined with a permanent magnet in such a way that the core may be initially magnetized to some degree in the reverse direction.

Figure 19:
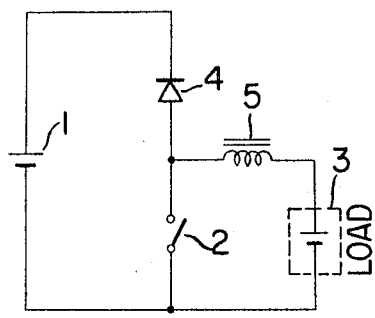
FIG. 19 is a circuit diagram of a prior art chopper with a power regenerative circuit which is an improvement of the prior art chopper of the type shown in FIG. 2.

Next will be described an application for feeding back power from the load 3 to the power supply 1 when the load 3 in the circuit shown in FIG. 4 is regenerative. FIG. 19 shows a prior art circuit which is a modification of the prior art circuit shown in FIG. 2 for power regeneration. In FIG. 19, reference numeral 1 denotes a DC power supply; 2, a switch; 3, a power regenerative load; 4, a circulation diode; and 5, a smoothing reactor.

Figure 20:
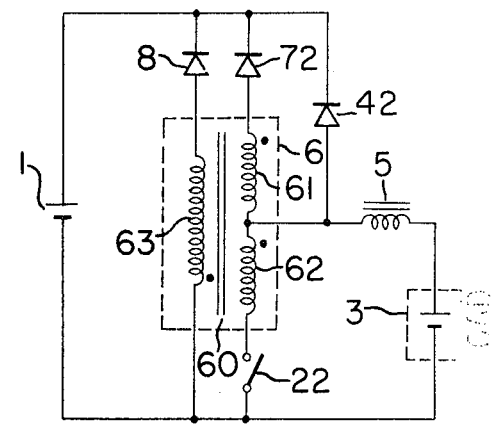
FIG. 20 is a circuit diagram of a modification for power regeneration of the circuit shown in FIG. 4.

One embodiment of a power regenerative circuit in accordance with the present invention is shown in FIG. 20, wherein reference numeral 1 denotes a DC power supply; 22, a switch; 3, a power regenerative load; 42, a circulation diode; 5, a smoothing reactor; 6, a transormer having first, second and third coils 61, 62 and 63 mounted on a core 60 with polarities shown; 72 and 8, diodes. The load 3 is assumed to have a counter electromotive force $V_L$, and the first, second and third coils 61, 62 and 63 have turns $W_{61}$, $W_{62}$ and $W_{63}$, respectively. When $$V_L > \frac{W_{62} \cdot Vs}{W_{61} + W_{62}}$$

and the switch 22 is closed, the transformer action occurs and the flux increase $\Delta\phi_t$ is given by $$\Delta \phi_t = \frac{Vs}{W_{61} + W_{62}} \cdot a \cdot T \tag{4}$$

Eq. (4) is same with Eq. (1).

It is assumed that the flux continues to decrease during the whole ON period of the switch 22. Then, the possible flux decrease $\Delta \phi -$ is given by $$\Delta \phi - = \frac{-Vs}{W_{63}} \cdot (1 - a) \cdot T \tag{5}$$

Eq. (5) is also same with Eq. (2). Therefore an "ON-time ratio a" at which the saturation of the core is started is given by Eq. (3). During the ON period of the switch; that is, when the transformer action takes place, a power from the load 3 is stored in the reactor 5 and is fed back to the power supply 1. When the switch 22 is opened, the power which has been stored in the reactor 5 is fed back to the power supply 1 through a diode 42.

It is assumed that when $$V_L < \frac{W_{62}}{W_{61} + W_{62}} Vs$$

the transformer has an impedance sufficiently greater than that of the reactor 5. Then, the flux increase $\Delta \phi_t$ when the switch 22 is closed is given by $$\Delta \phi_t = \frac{V_L}{W_{62}} \cdot a \cdot T \tag{6}$$

and the possible decrease in flux $\Delta \phi -$ is given by $$\Delta \phi - = \frac{-Vs}{W_{63}} \cdot (1 - a) \cdot T \tag{7}$$

From Eqs. (6) and (7), we have a saturation-starting "ON-time ratio $a_s$"

$$a_s = \frac{1}{\frac{V_L W_{63}}{Vs W_{62}} + 1} \tag{8}$$

When $a < a_s$, the power regeneration is impossible so that $a$ must be higher than $a_s$ for power regeneration.

When $a > a_s$, the transformer accomplishes a transformer action during an initial state of the closed or ON period of the switch 22, and is saturated during the remaining period. During the time when the transformer action takes place, a power from the load 3 is stored in the reactor 5 and is fed back to the power supply through the transformer. When the transformer is saturated, a power from the load 3 is only stored in the reactor 5. When the switch 22 is opened, the power which has been stored in the reactor 5 is fed back through the diode 42 to the power supply 1.

Figure 21:
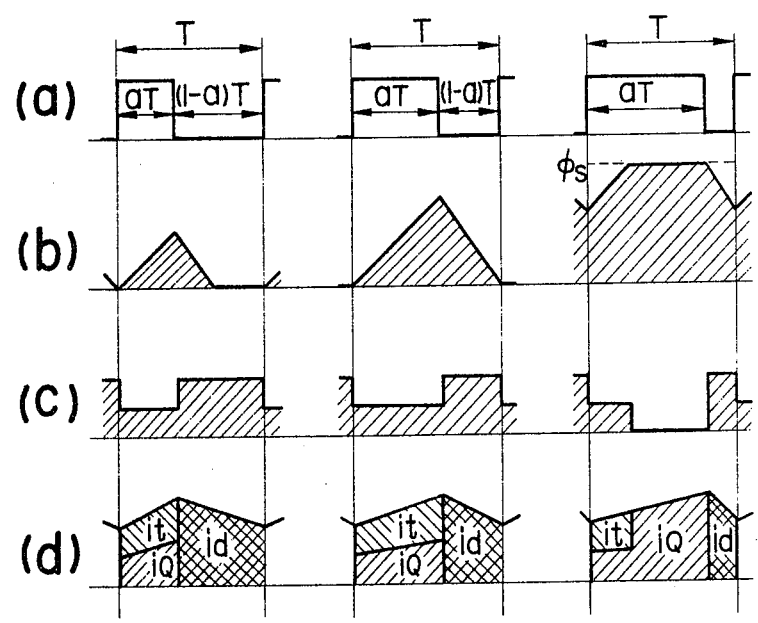
FIG. 21 is a diagram used for the explanation of the circuit shown in FIG. 20.

The mode of operation of the regenerative circuit shown in FIG. 20 is illustrated in FIG. 21(a) shows ON-OFF cycles of the switch 22. FIG. 21(b) shows the increase and decrease of flux, $\phi s$ indicating a saturation flux. FIG. 20(c) shows output voltages. During the time when the transformer action proceeds, the output voltage is given by $$\frac{W_{62}}{W_{61} + W_{62}} Vs$$

and when the transformer is saturated, the output voltage is equal to Vs. FIG. 20(d) shows load currents with $i_Q =$ current flowing through the switch 22, $i_t =$ current flowing through the first coil 61 and $i_d =$ current flowing through the diode 42.

As in the second embodiment shown in FIG. 4, when the transformer action proceeds, current flowing through the switch 22 may be decreased considerably as compared with the prior art chopper shown in FIG. 19 for obtaining a comparable load current so that with a switch with the same ratings with those of the switch used in the prior art chopper shown in FIG. 19, the circuit shown in FIG. 20 may control a greater load current.

Figure 22:
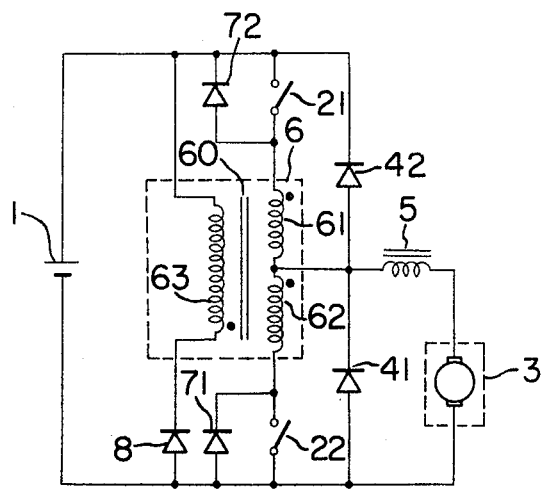
FIG. 22 is a circuit diagram of a combination consisting of the circuits shown in FIGS. 4 and 20, respectively.

FIG. 22 shows a circuit consisting of the circuits shown in FIG. 4 and FIG. 20 for controlling a DC motor 3. In this circuit, when the switch 22 is opened while the switch 21 is alternately opened and closed, the mode of operation is same with that of the circuit shown in FIG. 4. On the other hand, when the switch 21 is kept opened while the switch 22 is alternately opened and closed, the mode of operation is substantially similar to that of the circuit shown in FIG. 20. Therefore the circuit shown in FIG. 22 has the advantages both of the circuits shown in FIGS. 4 and 20. Furthermore, when the DC motor 3 is alternately accelerated and decelerated, rapid power exchanges may be effected between the DC motor 3 and the DC power supply 1 so that the control with a fast response may be ensured.

Figure 23:
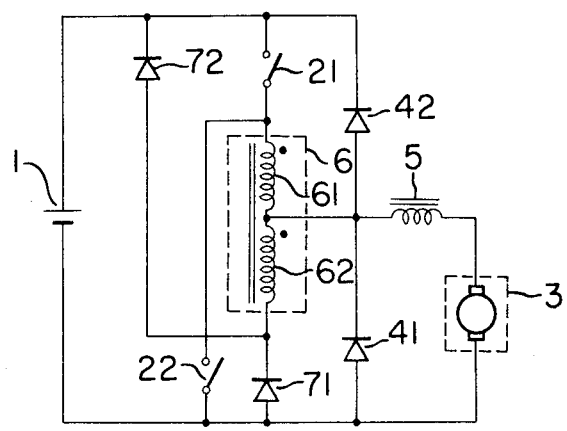
FIG. 23 is a diagram of the circuit shown in FIG. 8 and added with power regeneration ability.

FIG. 23 shows a modification of the circuit shown in FIG. 8 for controlling the DC motor or load 3. When the switch 22 and the diode 42 were eliminated from the circuit shown in FIG. 23, then the latter would be similar in both construction and operation to the circuit shown in FIG. 8. When a power is fed back from the motor 3 to the power supply 1, the switch 21 is kept closed while the switch 22 is alternately opened and closed as in the circuit shown in FIG. 20. Flux variation in the transformer core may be restored to an initial state by a circuit consisting of the diode 71, the second coil 62, the diode 42 and the power supply 1 when the switch 22 is opened. One unique advantage of the circuit shown in FIG. 23 over the circuit shown in FIG. 22 is the elimination of the third coil 63 of the latter.

Figure 24:
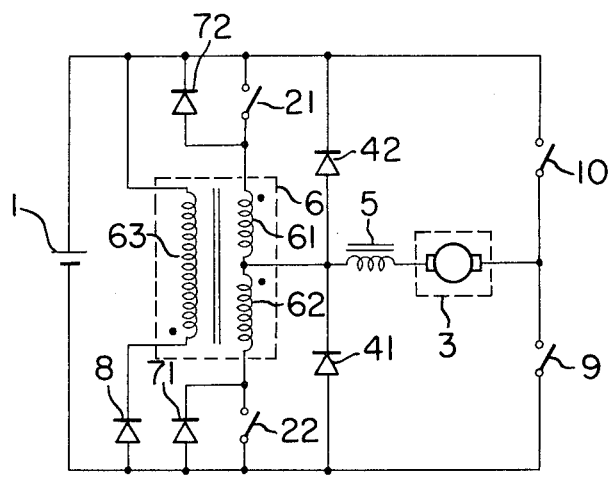
FIG. 24 is a diagram of the circuit shown in FIG. 22 and modified for controlling a DC motor load in both forward and reverse directions.

The circuit shown in FIG. 22 may be modified as shown in FIG. 24 in order to control the reverse control of the DC motor 3. When the switch 9 is closed, the mode of operation of the circuit shown in FIG. 24 is substantially similar to that of the circuit shown in FIG. 22. When the switch 10 is closed, the control in the reverse direction may be effected. It is to be understood that the circuit shown in FIG. 23 may be also so modified as to control the DC motor 3 in both the forward and reverse directions.

Next a pulsating current component in a load current will be described in conjunction with the prior art circuit shown in FIG. 2 and the second embodiment of the present invention shown in FIG. 4. Following the previous analysis, let Vs denote a power supply voltage; the L, an inductance of the reactor; T, the ON-OFF cycle of the switch; $a$, the "ON-ratio", $V_L$, the counter electromotive force of the load; and $\Delta i$, the pulsating current component in the load current. It is assumed that the resistance of the load is negligible with respect to the inductance of the reactor. Then, in the steady state of the prior art circuit shown in FIG. 2, the following well known relation is held:

$$V_L = a \cdot V_s \quad (9)$$

and $$\Delta i = \frac{a(1-a) \cdot V_s \cdot T}{L} \quad (10)$$

In the second embodiment shown in FIG. 4, let $$W_{61} : W_{62} = 1 : 1$$

for the sake of simplicity in analysis. Then, when $a < a_s$, $$V_L = \tfrac{1}{2} a \cdot V_s \quad (11)$$

and $$\Delta i = \frac{a(1-a) \cdot V_s \cdot T}{2L} \quad (12)$$

And when $a > a_s$ $$V_L = \frac{(3a-1) \cdot V_s}{2} \quad (13)$$

and $$\Delta i = \frac{(3a-1)(1-a) \cdot V_s \cdot T}{2L} \quad (14)$$

In like manner, in the prior art circuit shown in FIG. 19, $$V_L = (1-a) \cdot V_s \quad (15)$$

and $$\Delta i = \frac{a(1-a) \cdot V_s \cdot T}{L} \quad (16)$$

And in the circuit shown in FIG. 20, when $a < a_s$, $$V_L = (1 - \tfrac{a}{2}) \cdot V_s \quad (17)$$

and $$\Delta i = \frac{a(1-a) \cdot V_s \cdot T}{2L} \quad (18)$$

When $a > a_s$, $$V_L = \tfrac{3}{2}(1-a) \quad (19)$$

and $$\Delta i = \frac{(3a-1)(1-a) \cdot V_s \cdot T}{2L} \quad (20)$$

Figure 25:
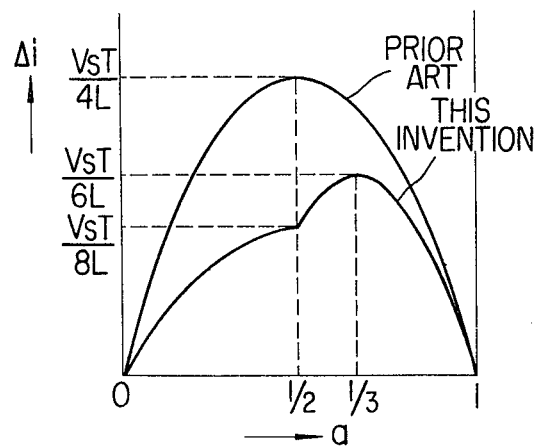
FIG. 25 is a graph used for the explanation of a pulsation current component in a load current in the circuits shown in FIGS. 2, 4, 19 and 20.

Eqs. (9), (11) and (13) are plotted as shown in FIG. 7, which has been already explained. Eqs. (10), (12) and (14) are graphed as shown in FIG. 25 which illustrates the relationship between the pulsating current $\Delta i$ in the load current and the "ON-time ratio" a. It is seen that in the circuits in accordance with the present invention, the pulsating current component $\Delta i$ is considerably smaller than that of the prior art circuits. With decrease in pulsating current component in load current, a pulsating current component in power supply current decreases so that satisfactory effects for both the load and the power supply may be otained.

Figure 26:
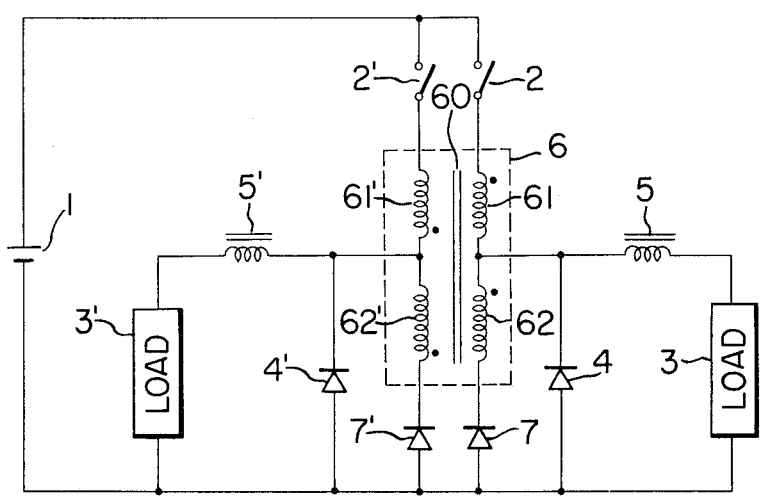
FIG. 26 is a diagram of a circuit consisting of two circuits of the type shown in FIG. 4 for controlling two loads.
Figure 27:
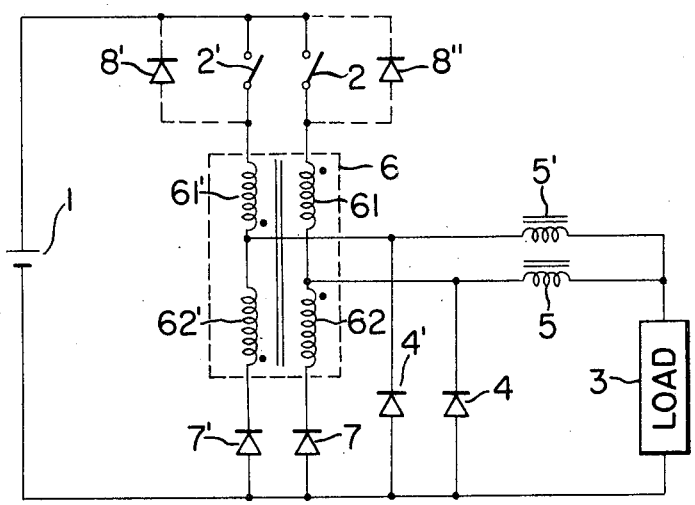
FIG. 27 is a diagram of a circuit similar to that shown in FIG. 26 but for controlling only one load.

FIG. 26 shows a circuit consisting of two circuits shown in FIG. 4 for controlling two loads. FIG. 27 shows a circuit consisting of two circuits shown in FIG. 4 for controlling one load. In both FIGS. 26 and 27, same reference numerals with those used in FIG. 4 are used to designate similar parts, and those added in the circuits shown in FIGS. 26 and 27 are designated by numerals with a prime. As shown, the coils 61 and 62 have polarities opposite to those of coils 61' and 62', and the third coil 63 shown in FIG. 4 is eliminated. The mode of operation of the circuit shown in FIG. 26 is same with that of the circuit shown in FIG. 27 so that the description of the latter will suffice.

Figure 28:
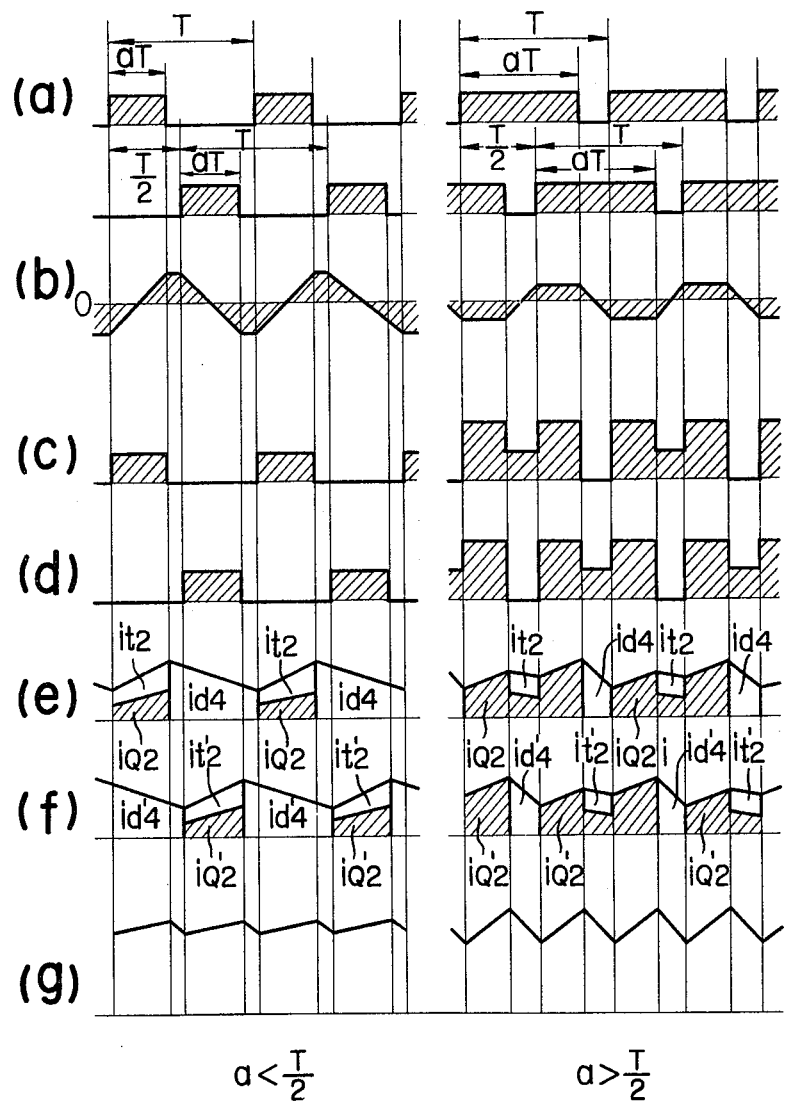
FIG. 28 is a diagram used for the explanation of the mode of operation of the circuit shown in FIG. 27.

The mode of operation of the circuit shown in FIG. 27 is illustrated in FIG. 28. FIGS. 28(a) and (b) show ON-OFF cycles of the switch 2 and a switch 2', respectively. FIG. 28(c) shows an output voltage at the junction between the coils 61' and 62'. FIG. 28(e) shows a current flowing through the reactor 5 while FIG. 28(f), a current flowing through a reactor 5'. FIG. 28(g) shows a current flowing through the load 3; that is, the sum of the currents shown in FIGS. 28(e) and 28(f). In FIG. 28, $i_{Q2}$ and $i_{Q2}$ denote currents flowing through the switches 2 and 2', respectively; $i_{l2}$ and $i'_{l2}$, currents flowing through the coils 62 and 62', respectively; and $i_{d4}$ and $i'_{d4}$, currents flowing through the diode 4 and a diode 4'.

Referring back to FIG. 27, the switches 2 and 2' may be actuated in any suitable manners, but for the sake of simplicity for explanation they are assumed to be turned on and off as shown in FIGS. 28(a) and (b) with an ON-OFF cycle of T, an ON time $T_{ON}$, and "ON-time ration a" defined by $a = T_{ON}/T$, and a phase difference of T/2 between them.

First the mode of operation when $a < T/2$ will be described. When the switch 2 is closed, a voltage is impressed across the windings 61 and 62, and an output voltage drops to a voltage, which is dependent upon a turn ratio, by the transformer action, and current flowing from the reactor 5 to the load 3 exceeds current flowing through the switch 2 as described previously. Concurrently, induced across the coils 61' and 62' is a voltage with polarities opposite to those of the voltage induced across the coils 61 and 62, and this reverse voltage is applied to the diode 7'. When the switch 2 is opened, current flows from the reactor 5 through the load 3 and the diode 4 and back to the reactor 5. In the steady state with the switch 2' opened, the current circulates through the reactor 5', the load 3 and the diode 4'. Therefore when the switch 2 is opened so that reverse voltages are induced across the coils, the diode 4' is enabled to conduct with the circulation current so that the voltage induced across the coil 62' is clamped by the diodes 4' and 7'. As a result, flux in the transformer is scarcely changed from a level to which flux has been increased when the switch 2 was opened. Exciting current flows through the coil 62', and when the circulation current flowing through the diode 4' is smaller than the exciting current of when the circulation current is discontinuous, a voltage is induced across the coil 62' so that it is desirable to insert a diode 8' for clamping voltages induced across the coils 61' and 62' to the voltage of the DC power supply 1. Same is true for a diode 8".

When the switch 2' is closed, magnetic flux is reversed in direction in the transformer. When the switch 2' is opened, a voltage induced across the coil 62 is clamped by the diodes 4 and 7 in manner substantially similar to that described above so that flux may remains almost unchanged. In like manner, the operations are cycled.

Next the mode of operation when $a > T/2$ will be described. Under this condition, the closed periods of the switches 2 and 2' are overlapped. With both the stitches 2 and 2' closed, no voltage is induced across any of the coils so that there is no flux change and consequently there results no transformer action. When one of the switches 2 and 2' is closed or when, for instance, the switch 2 is closed while the other of switch 2' is opened, current flows through the coils 61 and 62, and the transformer acts, and the circulation current flows through the diode 4'. When the switch 2' is closed while the switch 2 is opened, the current flows through the coil 61' and 62', and the transformer acts, and the circulation current flows through the diode 4.

As with the case of the so-called two-phase chopper consisting of two prior art choppers shown in FIG. 2, the circuit shown in FIG. 27 may control a load current twice as high as a current in each phase. Furthermore with a small $a$ or at a low voltage, currents flowing through the switches 2 and 2' increase by the transformer action so that a higher current may be made to flow through the load. Flux variation caused during the closed period of the switch 2 may be restored to an initial state during the closed period the switch 2' so that a circuit such as the coil 63 for restoring magnetic flux to an initial state may be eliminated.

Figure 29:
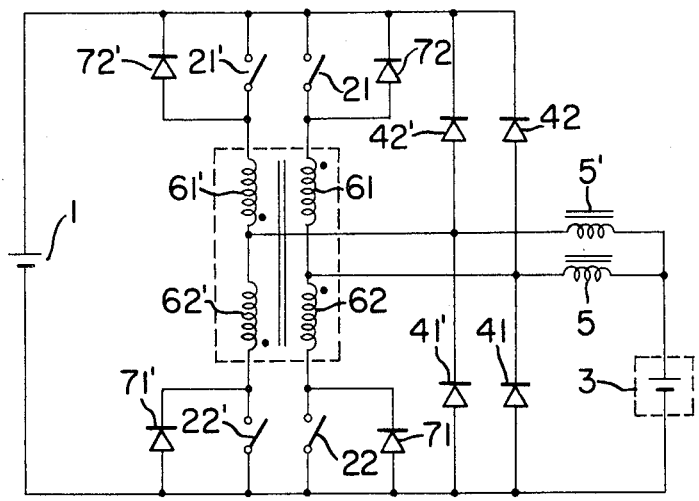
FIG. 29 is a diagram of the circuit shown in FIG. 27 and modified for power regeneration.

The circuit shown in FIG. 27 may be so modified as shown in FIG. 29 that a power may be fed back to the power supply from a regenerative load 3. With switches 22 and 22' opened and switches 21 and 21' being alternately opened and closed, the mode of operation of the circuit shown in FIG. 29 is similar to that of the circuit shown in FIG. 27. On the other hand, when the switches 21 and 21' are opened while the switches 22 and 22' are alternately opened and closed, a power is fed back to the power supply 1 from the regenerative load 3.

The power regenerative mode of the circuit shown in FIG. 29 will be described in more detail hereinafter. When the switch 22 is closed, a voltage across the load 3 is impressed across the reactor 5 and the coil 62 so that a power from the load 3 is fed back to the power supply 1 through the coil 61 and the diode 72 while being stored in the reactor 5. When the switch 22 is opened, the power which has been stored in the reactor 5 is fed back through the diode 42 to the power supply 1. When the current flowing through each reactor is continuous in the steady state, with the switch 22' opened the power which has been stored in the reactor 5' is fed back through the diode 42' to the power supply 1 in a manner substantially similar to that described above. Therefore voltage which would be induced across the windings when the switch 22 is opened are clamped by the diodes 42' and 72' at both ends of the coil 61'. As a result, magnetic flux in the transformer core remains almost unchanged.

When the switch 22' is closed, flux in the transformer core is reversed and the transformer action takes place so that a power from the load 3 is fed back through the winding 61' and the diode 72 to the power supply 1 while being stored in the reactor 5'. When the switch 22' is opened, the power which has been stored in the reactor 5' is fed back through the diode 42' to the power supply 1.

When $a_s$' of the switches 22 and 22' are increased so that their closed periods are overlapped, no transformer action results so that a voltage induced across the load 3 is all impressed across each reactor and is stored therein. Under this condition, no flux change occurs. When either of the switches 22 and 22' or when the switch 22 is closed while the switch 22' is opened, a power is fed back through the coil 61 and the diode 72 to the power supply 1 while the power which has been stored in the reactor 5' is fed back through the diode 42' to the power supply 1. When the switch 22' is closed while the switch 22 is opened, flux is reversed in direction so that a power is fed back through the coil 61' and the diodes 72' and 42 to the power to the power supply 1. During a time when the transformer action continues in the regenerative mode, current flowing through each switch decreases below current flowing through the corresponding reactor so that the circuit shown in FIG. 29 has an advantage in that with switches having the same current ratings it may control a higher load current as compared with a prior art circuit without a transformer. Furthermore when a load to be controlled is a DC motor, rapid exchanges of power between the power supply and the load or DC motor may be effected when the DC motor is accelerated or decelerated so that the control with a fast response may be possible.

What is claimed is:

1. A DC variable voltage device comprising a first switch connected to one terminal of a DC power supply,
   a transformer having a first coil connected in series with said first switch,
   said transformer having a second coil connected in series aiding with said first coil, said coils being mounted on a common magnetic core,
   a diode interconnected between said second coil and another terminal of said DC power supply for preventing short-circuiting of said DC power supply when said core is saturated when said first switch is closed,
   means for interconnecting a load between the junction between said first and second coils and said other terminal of said DC power supply, and
   a circuit coupled to said transformer and to a terminal of said power supply for restoring to an initial state the flux variation in said core produced when said first switch is closed, whereby said load may be controlled by the alternate opening and closing of said first switch.

2. A DC variable voltage device as set forth in claim 1 wherein said circuit for restoring to an initial state the flux variation in said core produced when said first switch is closed, comprises a third coil mounted on said core in opposition to said first and second coils and having one end thereof connected to said one terminal of said DC power supply, and a diode interconnected between the other end of said third coil and said other terminal of said DC power supply for preventing a current from flowing from said DC power supply into said third coil.

3. A DC variable voltage device as set forth in claim 1 wherein said circuit for restoring to an initial state the flux variation in said core produced when said first switch is closed, comprises a third coil mounted on said core in opposition to said first and second coils and having one end thereof connected to said one terminal of said DC power supply, and a resistor interconnected between the other end of said third coil and said other terminal of said DC power supply.

4. A DC variable voltage device as set forth in claim 1 wherein said circuit for restoring to an initial state the flux variation in said core produced when said first switch is closed, comprises a third coil mounted on said core in opposition to said first and second coils and having one end thereof connected to said one terminal of said DC power supply, and a parallel circuit comprising a resistor and a diode interconnected between the other end of said third coil and said other terminal of said DC power supply and with such polarities that the flow of current from said DC power supply may be prevented.

5. A DC variable voltage device as set forth in claim 1 wherein said circuit for restoring to an initial state the flux variation of said core produced when said first switch is closed, comprises a third coil mounted on said core in opposition to said first and second coils and having one end thereof connected to said one terminal of said DC power supply and the other end thereof connected to said other terminal of said DC power supply through a parallel circuit comprising a constant current source and a diode with polarities thereof such that the flow of current from said DC power supply through said current source may be prevented.

6. A DC variable voltage device as set forth in claim 5 wherein said constant current source comprises a resistor and a reactor connected in series with said resistor.

7. A DC variable voltage device as set forth in claim 1 wherein said circuit for restoring to an initial state the flux variation in said core produced when said first switch is closed, comprises a third coil mounted on said core with polarity opposite to those of said first and second coils and having one end thereof connected to said one terminal of said DC power supply and the other end thereof connected to said other terminal of said DC power supply through a parallel circuit comprising a diode with such polarities that the flow of current from said DC power supply through said third coil may be prevented, further comprising a switch across said diode which is closed when the flux is decreasing in said core.

8. A DC variable voltage device as set forth in claim 7 wherein said switch in said parallel circuit consists of a transistor, and a fourth coil mounted on said core with polarities same with those of said third coil so that a voltage induced across said fourth coil when said flux increase rate is negative may enable said transistor to conduct.

9. A DC variable voltage device comprising
a first switch connected to one terminal of a DC power supply,
a transformer having a first coil connected in series with said first switch,
said transformer having a second coil connected in series aiding with said first coil, said coils being mounted on a common magnetic core,
a first diode interconnected between said second coil and another terminal of said DC power supply for preventing shortcircuiting of said DC power supply when said core is saturated when said first switch is closed.
a series connected circuit consisting of a reactor and a load interconnected between the junction between said first and second coils and said other terminal of said DC power supply,
a second diode for conducting current circulated through said series-connected circuit of said reactor and said load when said first switch is opened, and
a circuit coupled to said transformer and to at least one of said terminals for restoring to an initial state the flux variation in said core produced when said first switch is closed, whereby said load may be controlled by the alternate opening and closing of said first switch.

10. A DC variable voltage device as set forth in claim 9 wherein said circuit for restoring to an initial state the flux variation in said core produced when said firwst switch is closed comprises a diode interconnected between the junction between said second coil and said first diode and one terminal of said DC power supply and with such polarities that the flow of current from said DC power supply may be prevented.

11. A DC variable voltage device as set forth in claim 9 wherein said circuit for restoring to an initial state the flux variation in said core produced when said first switch is closed, comprises a series circuit comprising a resistor and a diode interconnected between the junction between said first switch said first coil and the junction between said DC power supply and said first diode, said diode connected in series with said resistor preventing the flow of current through said resistor when said first switch is closed.

12. A DC variable voltage device as set forth in claim 9 wherein said circuit for restoring to an initial state the flux variation in said core produced when said first switch is closed, comprises a series circuit comprising a resistor and a diode interconnected between the ends of a series circuit comprising said first and second coils, said diode connected in series to said resistor preventing the flow of current through said resistor when said first switch is closed.

13. A DC variable voltage device as set forth in claim 9 wherein said circuit for restoring to an initial state the flux variation in said core produced when said first switch is closed, comprises a third coil mounted on said core in opposition to said first and second coils and having one end thereof connected to the junction between said first and second coils, and a parallel circuit comprising a diode and a resistor interconnected between the other end of said third coil and said one terminal of said DC power supply, said diode connected in parallel with said resistor preventing the flow of current from said DC power supply through said resistor.

14. A DC variable voltage device comprising
(a) a first switch connected to one terminal of a DC power supply,
(b) a transformer having a first coil connected in series with said first switch,
(c) said transformer having a second coil connected in series aiding with said first coil, said coils being mounted on a common magnetic core
(d) a first diode interconnected between said second coil and another terminal of said DC power supply and with such polarity that a short-circuiting of said DC power supply may be prevented when said transformer core is saturated during a time when said first switch is closed, (e) a series circuit comprising a reactor and load and interconnected between the junction between said first and second coils and said other terminal of said DC power supply, (f) a second diode connected in parallel with said series circuit for conducting current which is circulated through said reactor and said load when said first switch is opened, (g) a circuit for restoring to an initial state the flux variation in said core produced when said first switch is closed, (h) a second switch connected in parallel with said first diode for stepping up a voltage across said load by said transformer and feeding current back to said DC power supply, (i) a diode interconnected between said first coil and said one terminal of said DC power supply for preventing the flow of current from said DC power supply through said first coil, (j) a diode interconnected between the junction between said second diode and said series circuit comprising said reactor and said load and said one terminal of said DC power supply for conducting a current circulated through said reactor and said load when said second switch is opened, and (k) a circuit coupled to said transformer and to a terminal of said power supply for restoring to an initial state the flux variation in said core produced when said second switch is closed, whereby said load may be controlled by the alternate opening and closing of said first or second switch.

15. A DC variable voltage device comprising
(A) a first circuit comprising
  (a) a first switch connected to one terminal of a DC power supply,
  (b) a transformer having a first coil connected in series with said first switch,
  (c) said transformer having a second coil connected in series aiding with said first coil said coils being mounted on a common magnetic cire,
  (d) a first diode interconnected between said second coil and another terminal of said DC power supply for preventing a short-circuiting of said DC power supply when said transformer is saturated during a time when said first switch is closed,
  (e) a series circuit comprising a reactor and a load interconnected between the junction between said first and second coils and said other terminal of said DC power supply, and
  (f) a second diode connected in parallel with said series circuit for flowing a current which is circulated through said load and said reactor when said first switch is opened; and
(B) a second circuit substantially similar in construction to said first circuit comprising said apparatus (a) through (f) above, wherein a third coil and a fourth coil are mounted on said core with polarities opposite to those of said first and second coils of said first circuit, whereby said load is controlled by the alternate opening and closing of the switches in said first and second circuits.

16. A DC variable voltage device as set forth in claim 15 wherein said first and second coils and said third and fourth coils in said first and second circuits have the same numbers of turns respectively, and the switches in said first and second circuits are so actuated that the ON-OFF cycles thereof are spaced apart in time by a half cycle.

17. In a variable DC voltage device comprising
(A) a first circuit comprising
  (a) a first switch connected to one terminal of a DC power supply,
  (b) a transformer having a first coil connected in series with said first switch,
  (c) said transformer having a second coil connected in series aiding with said first coil, said coils being mounted on a common magnetic core,
  (d) a first diode interconnected between said second coil and another terminal of said DC power supply for preventing short-circuiting of said DC power supply when said transformer is saturated during a time when said first switch is closed,
  (e) a series circuit comprising a reactor and a load interconnected between the junction between said first and second coils and said other terminal of said DC power supply, and
  (f) a second diode connected in parallel with said series circuit for conducting a current circulated through said reactor and said load when said first switch is opened; and
(B) a second circuit substantially similar in construction to said first circuit wherein a third coil and a fourth coil of said second circuit are mounted on said core with polarities opposite to those of said first and second coils of said first circuit, whereby said load is controlled by the alternate opening and closing of said first switches of said first and second circuits, the improvement comprising
(a) a second switch connected in parallel with said first diode in each of said first and second circuits,
(b) a third diode connected in parallel with said first switch in each of said first and second circuits so that the flow of current from said DC power supply therethrough may be prevented, and
(c) a fourth diode interconnected between the junction between said second diode and said reactor of said series circuit and said one terminal of said DC power supply for preventing the flow of current from said DC power supply therethrough.

18. The improvement as set forth in claim 17 wherein said first and second coils and said third and fourth coils of said first and second circuits have the same numbers of turns, respectively, and said first switches in said first and second circuits are so acutated that the ON-OFF cycles thereof are spaced apart in time by a half cycle whereas said second and fourth switches in said first and second circuits respectively are so actuated that ON-OFF cycles are spaced apart in time by a half cycle.

* * * * *

UNITED STATES PATENT OFFICE

CERTIFICATE OF CORRECTION

Patent No. 4,095,166      Dated June 13, 1978

Inventor(s) Nobuho Shibata, et al

It is certified that error appears in the above-identified patent and that said Letters Patent are hereby corrected as shown below:

In the drawings, Figure 20 is faded and should be clarified to appear as shown below:

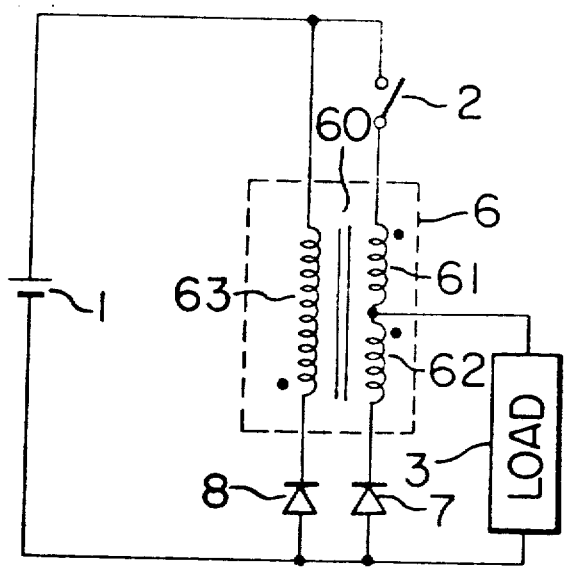

FIG. 20

UNITED STATES PATENT OFFICE
CERTIFICATE OF CORRECTION

Patent No. 4,095,166          Dated June 13, 1978

Inventor(s) Nobuho Shibata, et al

It is certified that error appears in the above-identified patent and that said Letters Patent are hereby corrected as shown below:

Column 7, line 48, delete "a".

Column 8, line 65, "the L, an" should be -- L, the --.

Column 14, line 19, "firwst" should be --first--.

Column 15, line 43, "cire" should be --core--.

Signed and Sealed this

Third Day of April 1979

[SEAL]

Attest:

RUTH C. MASON
Attesting Officer

DONALD W. BANNER
Commissioner of Patents and Trademarks